(12) United States Patent
Cheng et al.

(10) Patent No.: US 9,103,977 B2
(45) Date of Patent: Aug. 11, 2015

(54) METHOD FOR MANUFACTURING A HARD, WATER-RESISTANT ANTI-FOG COATING

(75) Inventors: Liao-Ping Cheng, New Taipei (TW); Ching-Chung Chen, Taipei (TW); Feng-Hsi Huang, New Taipei (TW); Hsu-Hsien Chang, Tainan (TW)

(73) Assignee: TAMKANG UNIVERSITY, New Taipei (TW)

(*) Notice: Subject to any disclaimer, the term of this patent is extended or adjusted under 35 U.S.C. 154(b) by 537 days.

(21) Appl. No.: 13/325,318

(22) Filed: Dec. 14, 2011

(65) Prior Publication Data

US 2013/0157066 A1 Jun. 20, 2013

(51) Int. Cl.
| | | |
|---|---|---|
| *B32B 9/04* | (2006.01) |
| *B05D 3/06* | (2006.01) |
| *G02B 1/14* | (2015.01) |
| *G02B 1/10* | (2015.01) |
| *G02B 27/00* | (2006.01) |
| *C08J 7/04* | (2006.01) |

(52) U.S. Cl.
CPC . *G02B 1/14* (2015.01); *C08J 7/045* (2013.01); *G02B 1/105* (2013.01); *G02B 27/0006* (2013.01)

(58) Field of Classification Search
CPC .............. C04B 41/009; C04B 2103/40; C04B 41/4922; C04B 1/4961; C04B 41/4846
USPC ......................................................... 427/515
See application file for complete search history.

(56) References Cited

U.S. PATENT DOCUMENTS

| | | | | |
|---|---|---|---|---|
| 5,273,812 | A * | 12/1993 | Oguchi et al. | 428/220 |
| 6,800,330 | B2 * | 10/2004 | Hayashi et al. | 427/387 |
| 2004/0115831 | A1 * | 6/2004 | Meathrel et al. | 436/514 |
| 2006/0160917 | A1 * | 7/2006 | Oyanagi et al. | 522/7 |
| 2007/0031660 | A1 * | 2/2007 | Kanamaru et al. | 428/355 AC |
| 2011/0003160 | A1 | 1/2011 | Zhao et al. | |

FOREIGN PATENT DOCUMENTS

JP 2011-140589 A 7/2011

OTHER PUBLICATIONS

Seong Woo Kim. Characterization of UV curable hybrid hard coating materials prepared by sol-gel method. (2011) Korean J. Chem. Eng. 28 (1), pp. 298-303.*

(Continued)

*Primary Examiner* — Dah-Wei D Yuan
*Assistant Examiner* — Kristen A Dagenais
(74) *Attorney, Agent, or Firm* — Muncy, Geissler, Olds & Lowe, P.C.

(57) ABSTRACT

The present invention relates to a method for manufacturing a hard, water-resistant anti-fog coating, and particularly relates to a method for manufacturing a hard, water-resistant anti-fog coating on plastic material. In this method, an organic-inorganic hard adhesion layer and a hydrophilic anti-fog coating film are prepared for manufacturing a hard, water-resistant anti-fog coating. Both of the organic-inorganic hard adhesion layer and the hydrophilic anti-fog coating have C=C double bonds. Therefore, the organic-inorganic hard adhesion layer and the hydrophilic anti-fog coating are adhered to each other tightly. It brings high hardness, high water resistance and good anti-fog effect.

34 Claims, 7 Drawing Sheets

(56) References Cited

OTHER PUBLICATIONS

Chemicalland21.com. Lauryl Alcohol Ethoxylates. http://www.chemicalland21.com/specialtychem/perchem/LAURYL%20ALCOHOL%20ETHOXYLATE.htm. Mar. 18, 2006.*

Seong Wood Kim. Characterization of UV curable hybrid hard coating materials prepared by sol-gel method. Korean J. Chem. Eng 28(1) 298-303 (2011).*

Official Action issued on Dec. 9, 2013, by the Taiwanese Patent Office in corresponding application No. 102216972600.

* cited by examiner

METHOD FOR MANUFACTURING A HARD, WATER-RESISTANT ANTI-FOG COATING

BACKGROUND OF THE INVENTION

1. Field of the Invention

The present invention relates to a method for manufacturing a hard, water-resistant anti-fog coating, and particularly relates to a method for manufacturing a hard, water-resistant anti-fog coating on plastic material.

2. Description of the Prior Art

The fundamental of anti-fog property is to form a hydrophilic surface on a base material wherein water drops condensed by the hydrophilic surface have little contact angle on the surface of the base material to naturally form a continuous or substantial continuous water film for avoiding light scattering resulted from the water drops and for maintaining the original optical transmittance of the base material.

Preparing methods for a hydrophilic surface are classified into three: (1) a hydrophilic agent is directly introduced into a polymer processing process to form a hydrophilic surface on the surface of the base material. Although this method has a simple process and it is easy to operated, but the hydrophilic agent will diffuse to the surface of the base material and diffuse from the surface into the air. Therefore, the hydrophilic agent will disappear with time. as a result, the surface of the base material can not maintain it's hydrophilic property for a long time and the hydrophilic surface disappears with time. Therefore, this method only can be used to be packages of foods having shorter life cycles. (2) The surface of the base material is chemically modified directly to form a hydrophilic film on the surface of the base. Therefore, the hydrophilic groups are difficult to depart from the surface of the base material, and the surface of the base material can get good hydrophilic property. However, this method has critical limit for size of base material and processing conditions, and the hardness of the hydrophilic surface formed by this method is bad. (3) Hydrophilic groups are introduced into a coating, and then, a hydrophilic film is formed on the base material by coating technology, photo curing technology, or heat curing technology. Although foregoing three methods can be utilized to treat surfaces of various base materials and the hydrophilic (coating) film (anti-fog coating (film)) manufacturing by these methods is a single-layered structure, but in these methods, it is easy for water to intrude between the hydrophilic film and the base material because of the hydrophilic groups. And it results in loss and disappearance of the hydrophilic (coating) film (anti-fog coating (film)) adhesion of the hydrophilic (coating) film (anti-fog coating (film)). Currently, for preparing a hydrophilic (coating) film (anti-fog coating (film)), an inorganic oxide, for example $TiO_2$, $ZnO$, or $ZrO_2$, is used to prepare a coating, and then, the coating is coated on a glass material or a ceramic material and it is treated with high temperature to get good adhesion. Although the coating (film) has good hydrophilic property and high hardness, but the high temperature treatment brings a limit that only some kinds of base materials can be utilized by this method. Therefore, some base materials which can not sustain high temperature can be utilized, and particularly, the plastic material can be utilized.

Currently, expect the anti-fog property of the hydrophilic (coating) film, people have more and more respect for the easy-to-clean property of the hydrophilic (coating) film. Generally, hydrophilic groups have both of hydrophilic property and lipophilic property because the hydrophilic groups have high surface energy. Except mist, there are many organic compounds existing in nature environment. The anti-fog ability of the hydrophilic (coating) film is decreased because the organic compounds existing in nature environment are adhered to the hydrophilic (coating) film or fingerprints are attached to the hydrophilic (coating) film. Therefore, it often has a need of washing the hydrophilic (coating) film with water. However, it is easy for the hydrophilic (coating) films, which are manufactured by foregoing three methods, to be intruded by water and it results in disappearance of the adhesion of the hydrophilic (coating) films because of existing of the hydrophilic groups. The adhesion of the hydrophilic (coating) films is decreased through frequently washing. Therefore, the lifetime of the hydrophilic (coating) films is substantially decreased.

Besides, there are some problems for manufacturing an anti-fog coating (film) on a plastic material: First, the plastic material is sensitive to temperature (or heat) and solvent, and it is difficult to chemically modify the plastic material. If the anti-fog coating (film) is manufactured by coating the hydrophilic coating on the plastic material, it is easy for water to intrude between the anti-fog coating (film) and the plastic material because of existing of the hydrophilic groups and it results in disappearance of adhesion of the anti-fog coating (film). Therefore, it has a need to improve the adhesion between the anti-fog coating (film) and the plastic material in high humidity environment for avoiding the anti-fog coating (film) peeling off form the plastic material. Final, the anti-fog coating (film) manufactured by the conventional method, in which the hydrophilic coating is coated on the plastic material, is not hard enough to avoid scraping and damaging. Therefore, it is not practical.

Therefore, it has a need of a method for manufacturing a hard, water-resistant anti-fog coating on plastic material by which the drawbacks of the conventional methods can be overcome and the adhesion, hardness, and water resistance of the anti-fog coating can be improved. Therefore, an anti-fog coating which is adhered to the plastic material well and has high hardness and high water resistance, is prepared by this method. Furthermore, an anti-fog coating, which is difficult to be intruded and broken by water and can be washed frequently, can be provided by this method, too.

SUMMARY OF THE INVENTION

In view of the foregoing, one object of the present invention is to provide a method for manufacturing a hard, water-resistant anti-fog coating by which the drawbacks of the conventional methods can be overcome and the adhesion, hardness, and water resistance of the anti-fog coating can be improved and increased.

Another object of the present invention is to provide a method for manufacturing a hard, water-resistant anti-fog coating on a plastic material by which an anti-fog coating having the advantages of good adhesion for plastic material, high hardness, and good water resistance can be prepared. Furthermore, the anti-fog coating which is difficult to be intruded and broken by water can be prepared, too.

According to the objects above, a method for manufacturing a hard, water-resistant anti-fog coating is disclosed herein. The method comprises following steps: First, an organic-inorganic hybrid hard adhesion layer is formed on a base material wherein the organic-inorganic hybrid hard adhesion layer contains some unreacted carbon-carbon double bonds (C═C). And then, a hydrophilic anti-fog coating film is formed on the organic-inorganic hybrid hard adhesion layer wherein the hydrophilic anti-fog coating film also contains some unreacted carbon-carbon double bonds (C═C). A cross-linked layer is formed between the organic-inorganic hybrid hard adhesion layer and the hydrophilic anti-fog coating film by cross-linking of the carbon-carbon double bonds (C═C) in the organic-inorganic hybrid hard adhesion layer and the hydrophilic anti-fog coating film. By this cross-linked layer, the hydrophilic anti-fog coating film is adhered to the organic-inorganic hybrid hard adhesion layer tightly to bring a good chemical adhesion. Therefore, it is difficult for water to intrude into the anti-fog coating, and the adhesion of the anti-fog coating for plastic material and the hardness and the water resistance of the anti-fog coating can be improved and increased.

According to the objects above, a hard, water-resistant anti-fog coating is disclosed herein. The hard, water-resistant anti-fog coating comprises an organic-inorganic hybrid hard adhesion layer formed on a plastic material for increasing hardness and adhesion of the hard, water-resistant anti-fog coating to make the hard, water-resistant anti-fog coating to be adhered on the plastic material well; a hydrophilic anti-fog coating film formed on the organic-inorganic hybrid hard adhesion layer for bringing anti-fog property to the plastic material; and a cross-linked layer between the organic-inorganic hybrid hard adhesion layer and the hydrophilic anti-fog coating film wherein the cross-linked layer is formed by cross-linking of the organic-inorganic hybrid hard adhesion layer and the hydrophilic anti-fog coating film, and the hydrophilic anti-fog coating film is adhered to the organic-inorganic hybrid hard adhesion layer tightly by the cross-linked layer. The cross-linked layer provides a good chemical adhesion between the organic-inorganic hybrid hard adhesion layer and the hydrophilic anti-fog coating film. Therefore, the hard, water-resistant anti-fog coating has the advantages of good adhesion for plastic material, high hardness, and high water resistance. Furthermore, the anti-fog coating is difficult to be intruded and broken by water.

Therefore, comparing with the prior art, the effect of this invention is to provide a method for manufacturing a hard, water-resistant anti-fog coating, and particularly to provide a method for manufacturing a hard, water-resistant anti-fog coating on plastic material by which a anti-fog coating having the advantages of good adhesion for plastic material, high hardness, and good water resistance can be prepared. Furthermore, the anti-fog coating which is difficult to be intruded and broken by water can be prepared, too.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components. Although specific embodiments have been illustrated and described, it will be appreciated by those skilled in the art that various modifications may be made without departing from the scope of the present invention, which is intended to be limited solely by the appended claims.

Figure 1:
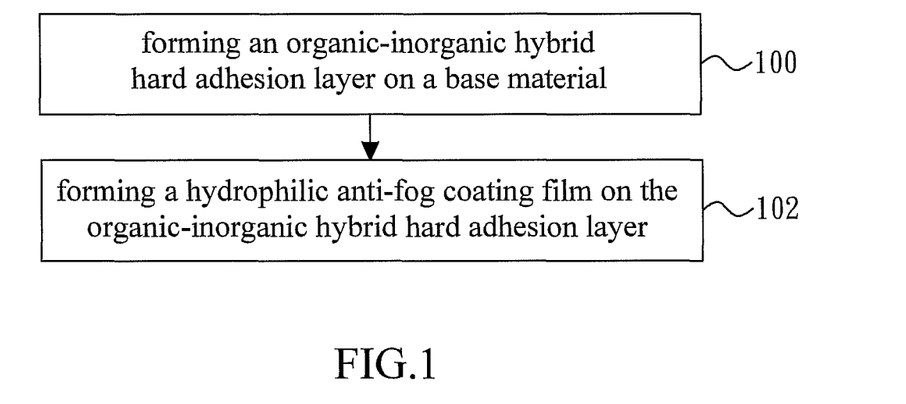
FIG. 1 is a flow chart illustration of a method for manufacturing a hard, water-resistant anti-fog coating in accordance with an embodiment of the present invention.

Referring to FIG. 1, it is a flow chart illustration of a method for manufacturing a hard, water-resistant anti-fog coating in accordance with an embodiment of the present invention. The method for manufacturing a hard, water-resistant anti-fog coating comprises two stages: preparing or forming an organic-inorganic hybrid hard adhesion layer which is lower layer of this anti-fog coating and preparing or forming a hydrophilic anti-fog coating film which is upper layer of this anti-fog coating. Referring FIG. 1, first, an organic-inorganic hybrid hard adhesion layer is prepared. In this stage, an organic-inorganic hybrid hard adhesion layer is formed on a base material (particularly on a plastic material) (step 100). The organic-inorganic hybrid hard adhesion layer (or called as organic-inorganic hybrid (coating) film) still contains some unreacted carbon-carbon double bonds (C═C). And then, a hydrophilic anti-fog coating film is prepared. In this stage, a hydrophilic anti-fog coating film is formed on the organic-inorganic hybrid hard adhesion layer (step 102). Similarly, the hydrophilic anti-fog coating film also contains some unreacted carbon-carbon double bonds (C═C). When the hydrophilic anti-fog coating film is formed on the organic-inorganic hybrid hard adhesion layer, the carbon-carbon double bonds (C═C) in the organic-inorganic hybrid hard adhesion layer are cross-linked with the carbon-carbon double bonds (C═C) in the hydrophilic anti-fog coating film to form a cross-linked layer between the organic-inorganic hybrid hard adhesion layer and the hydrophilic anti-fog coating film. Therefore, the hydrophilic anti-fog coating film is adhered to the organic-inorganic hybrid hard adhesion layer tightly by the cross-linked layer and the anti-fog coating can have good chemical adhesion by this way. Consequently, it is difficult for water to intrude into the anti-fog coating, and the adhesion of the anti-fog coating for the plastic material, hardness of the anti-fog coating, and water resistance of the anti-fog coating are improved and increased.

Figure 2:
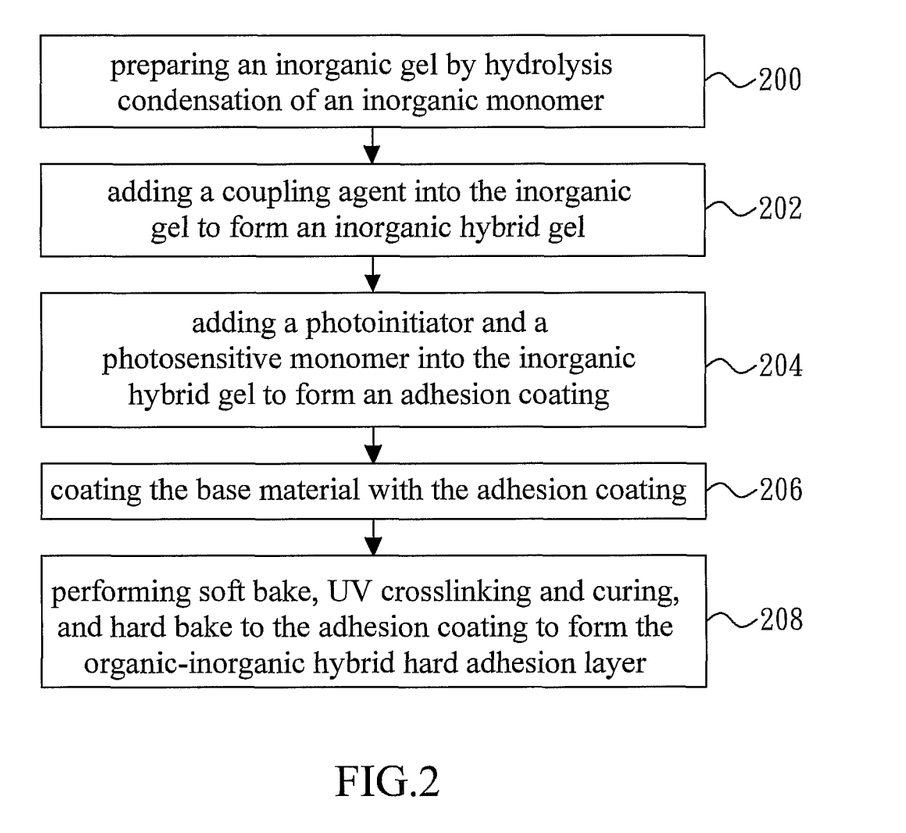
FIG. 2 is a flow chart illustration of a method for forming an organic-inorganic hybrid hard adhesion layer.
Figure 5A:
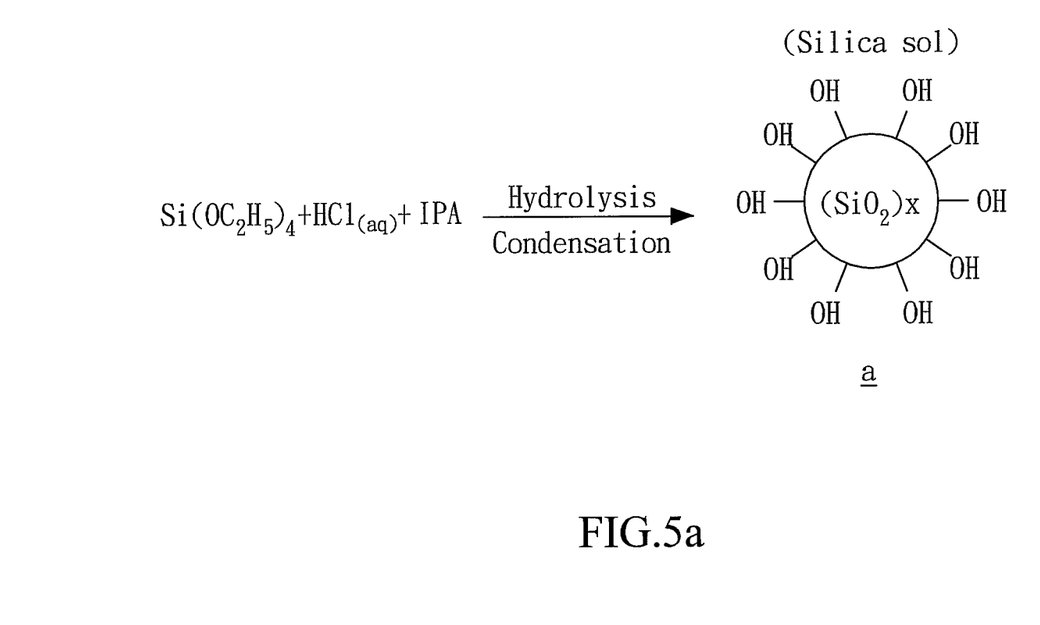
FIG. 5a shows a chemical equation of hydrolysis condensation showed in step 200 of FIG. 2.

Referring to FIG. 2, it is a flow chart illustration of a method for forming an organic-inorganic hybrid hard adhesion layer. It is flow chart illustration of the step of forming the organic-inorganic hybrid hard adhesion layer on the base material (step 100) showed in FIG. 1. First, an inorganic gel is prepared or formed by hydrolysis condensation of an inorganic monomer (step 200). Referring to FIG. 5a simultaneously, it shows a chemical equation of hydrolysis condensation showed in step 200 of FIG. 2. The inorganic monomer is tetraethoxylsilane (TEOS) or other similar silanoxides. In step 200, the TEOS and 2-propanol (IPA) are uniformly mixed, and then, a hydrochloric acid solution is added into mixture of the TEOS and the 2-propanol (IPA) wherein pH value of hydrochloric acid solution is 1 to 3. The mixture of the TEOS, the 2-propanol (IPA) and the hydrochloric acid solution is stirred at room temperature to form or prepare an inorganic gel (silica sol) a.

In step 200, the mixing percentage of the TEOS is 10%-90% weight percentage (w/w) of total weight percentage (w/w), and the mixing percentage of the 2-propanol is 10%-90% weight percentage (w/w) of total weight percentage (w/w). The sum of the mixing percentage of the TEOS and the mixing percentage of the 2-propanol are 100% weight percentage (w/w). In another embodiment of this invention, the mixing percentage of the TEOS is 20%-80% weight percentage (w/w) of total weight percentage (w/w), and the mixing percentage of the 2-propanol is 20%-80% weight percentage (w/w) of total weight percentage (w/w). In still another embodiment of this invention, the mixing percentage of the TEOS is 35%-65% weight percentage (w/w) of total weight percentage (w/w), and the mixing percentage of the 2-propanol is 35%-35% weight percentage (w/w) of total weight percentage (w/w). Besides, other alcohols, for example methanol, ethanol, 1-propanol, 1-butanol or other suitable alcohols, can be used in place of 2-propanol (IPA) to perform the hydrolysis condensation reaction for forming the inorganic gel (or silica sol).

Figure 5B:
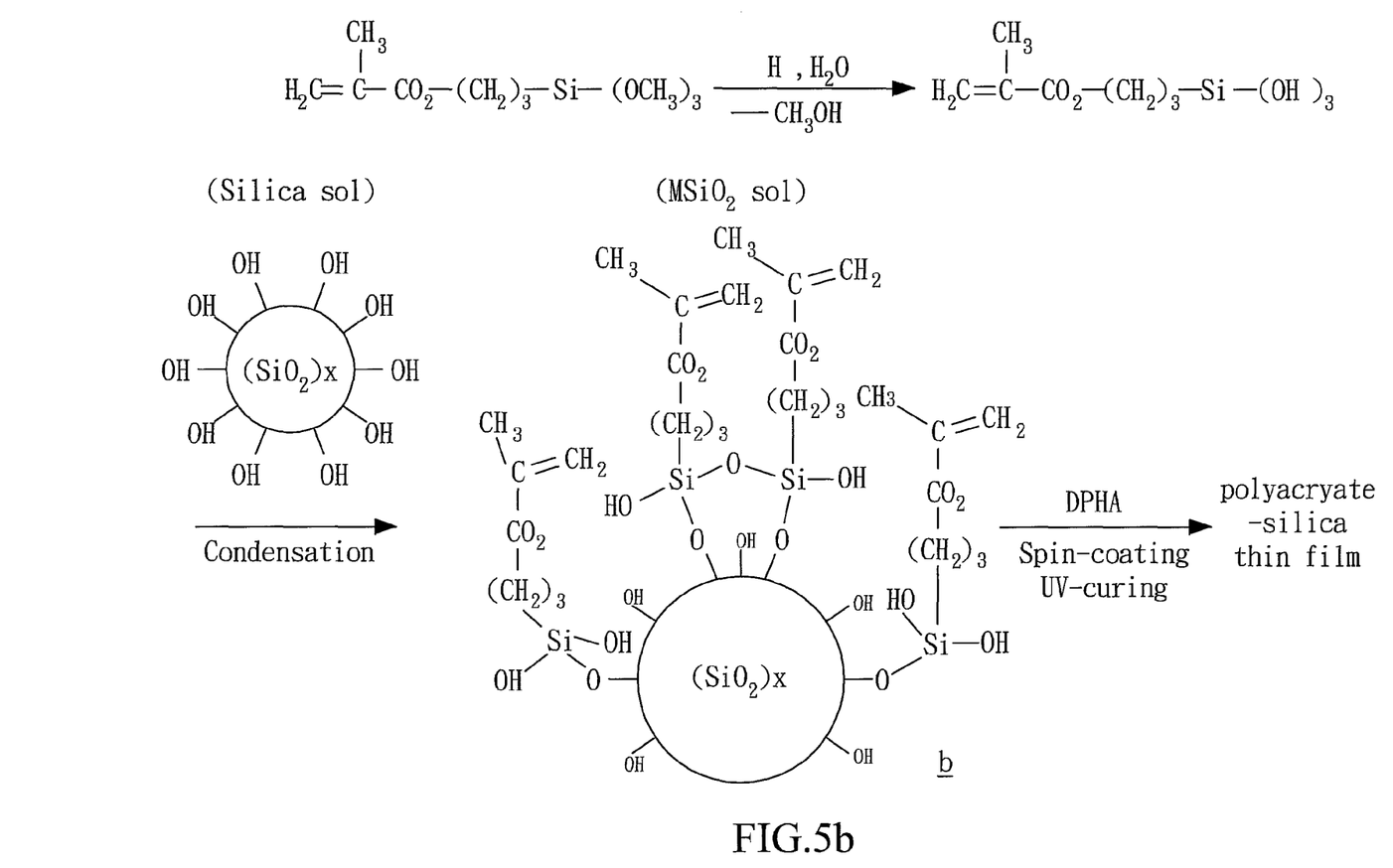
FIG. 5b shows chemical equations showed in steps 202 to 208 of FIG. 2.

After, a coupling agent is added into the inorganic gel (or silica sol) to continue the hydrolysis condensation reaction for modifying surface of the inorganic gel (or silica sol) with hydroxyl groups (—OH) to form an inorganic hybrid gel (or $MSiO_2$ sol) (step 202). Referring to FIG. 5b, it shows chemical equations showed in steps 202 to 208 of FIG. 2. The coupling agent is 3-(trimethoxy silyl) propyl methacrylate (MSMA) or other similar coupling agents. In step 202, when the MSMA is in an acid aqueous solution —$OCH_3$ groups of the MSMA are replaced by hydroxyl groups (—OH). It is added into the inorganic gel (or silica sol) and a hydrochloric acid solution is resupplied to the inorganic gel (or silica sol). The pH value of the hydrochloric acid solution is 1 to 3. And then, the mixture of the inorganic gel (or silica sol), the MSMA and the hydrochloric acid solution is stirred at room temperature to continue the hydrolysis condensation reaction to form the inorganic hybrid gel (or $MSiO_2$ sol) b.

And then, a photoinitiator and a photosensitive monomer are added into the inorganic hybrid gel (or $MSiO_2$ sol) b to form an adhesion coating (step 204). The photoinitiator is Darocure 1173, Irgacure 907, Isopropyl thioxanthone (ITX), or other similar photoinitiators. The photosensitive monomer is Dipentaerythritol hexaacrylate (DPHA), Trimethylol propane triacrylate (TMPTA), Pentaerythritol tetraacrylate (PETA), Di(trimethylolpropane) tetraacrylate (DiTMPTA), 1,6-Hexanediol diacrylate (HDODA) or other similar photosensitive monomers.

In step 204, 1%-99% weight percentage of the photosensitive monomer is added into the inorganic hybrid gel (or $MSiO_2$ sol) b, and 0.1%-10% weight percentage (wt %) of the photoinitiator is added into the inorganic hybrid gel (or $MSiO_2$ sol) b. In another embodiment of this invention, 5%-80% weight percentage of the photosensitive monomer is added into the inorganic hybrid gel (or $MSiO_2$ sol) b, and 0.5%-8% weight percentage (wt %) of the photoinitiator is added into the inorganic hybrid gel (or $MSiO_2$ sol) b in step 204. In still another embodiment of this invention, 10%-50% weight percentage of the photosensitive monomer is added into the inorganic hybrid gel (or $MSiO_2$ sol) b, and 1%-5% weight percentage (wt %) of the photoinitiator is added into the inorganic hybrid gel (or $MSiO_2$ sol) b in step 204.

After step 204, the base material (or the plastic material) is coated with the adhesion coating by manual method, for example manual coating with a scraper or other manual methods, or by mechanical method, for example spin coating or other coating methods (step 206). And then, a soft bake, a UV curing, and a hard bake are performed to the adhesion coating coated on the base material (or the plastic material) to form a polyacryate-silica thin film on the base material (step 208). The polyacryte-silica thin film is the organic-inorganic hybrid hard adhesion layer of this invention. In both of the soft bake process and the hard bake process, the adhesion coating coated on the base material (or the plastic material) is baked at the temperature of 60° C. to 80° C. for 10 seconds to 2 minutes in order to dry the adhesion coating. The above mentioned baking temperature and baking time are not used to be the limits of the soft bake process and the hard bake process, and they can be changed according to any requirement.

In the UV curing process of step 208, the UV curing is performed to the adhesion coating by illuminating the adhesion coating coated on the base material (or the plastic material) with proper UV energy and UV exposure. The proper UV energy and the UV exposure are the UV energy and the UV exposure which are not enough to react with all carbon-carbon double bonds (C═C) in the adhesion coating. By the UV curing process, some of the carbon-carbon double bonds (C═C) in the adhesion coating react with UV light for curing and hardening the adhesion coating. At the time of curing the adhesion coating coated on the base material, portion of carbon-carbon double bonds (C═C) in the adhesion coating does not react with UV light because the illumination of UV light provided to the adhesion coating is not enough. It means that the UV energy and the UV exposure provided to the adhesion coating is not enough to react with all of the carbon-carbon double bonds (C═C) in the adhesion coating. Therefore, the organic-inorganic hybrid hard adhesion layer can have good chemical attachment or adhesion to the hydrophilic anti-fog coating film by these carbon-carbon double bonds (C═C) remaining in the organic-inorganic hybrid hard adhesion layer. The UV energy provided in the UV curing process is 0.01-100 $mJ/cm^2$. In another embodiment of this invention, the UV energy provided in the UV curing process is 0.1-50 $mJ/cm^2$. In still another embodiment of this invention, the UV energy provided in the UV curing process is 0.5-20 $mJ/cm^2$.

The organic-inorganic hybrid hard adhesion layer prepared by the method showed in FIG. 2 is a photosensitive polymer/silicon dioxide nano composite material, and it brings good attachment or adhesion between the anti-fog coating of this invention and the base material (particularly the plastic material). The organic-inorganic hybrid hard adhesion layer can bring high hardness to the anti-fog coating of this invention because it is a hard adhesion layer treated by UV curing. Besides, the organic-inorganic hybrid hard adhesion layer can cross-link with the hydrophilic anti-fog coating film thereon because there are still some carbon-carbon double bonds (C═C) in the organic-inorganic hybrid hard adhesion layer. Therefore, it can have good attachment (or adhesion) to the hydrophilic anti-fog coating film thereon, and the organic-inorganic hybrid hard adhesion layer. And the hydrophilic anti-fog coating film can adhered to each other tightly without intrusion of water.

Figure 3:
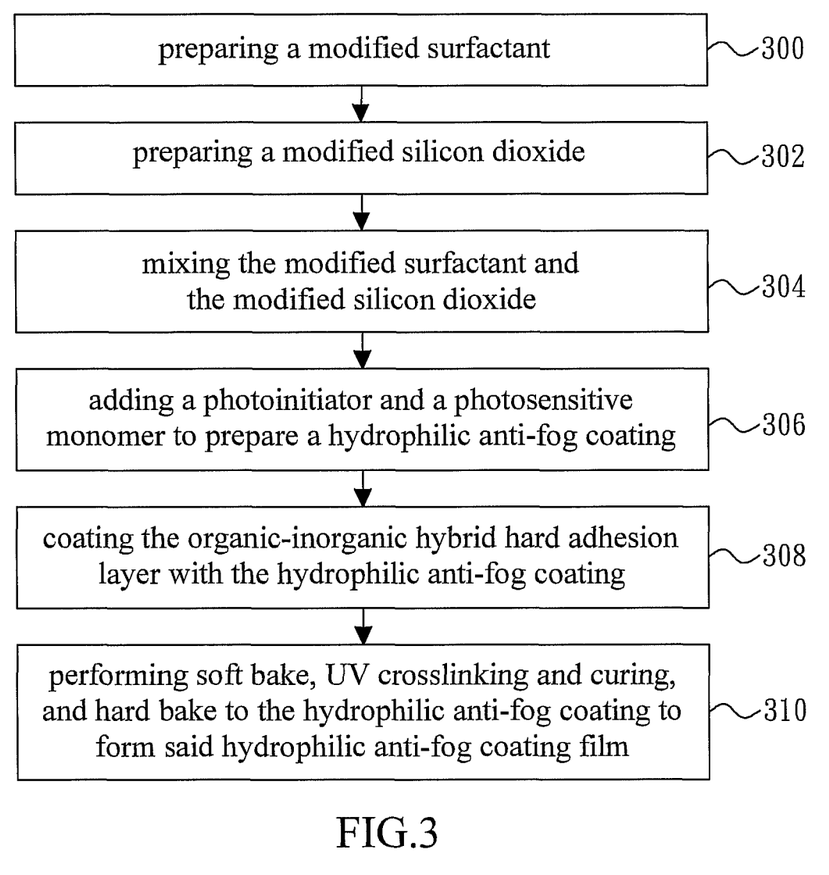
FIG. 3 is a flow chart illustration of a method for forming a hydrophilic anti-fog coating film.

Referring to FIG. 3, it is a flow chart illustration of a method for forming a hydrophilic anti-fog coating film. It is a flow chart illustration of the step of forming a hydrophilic anti-fog coating film on the organic-inorganic hybrid hard adhesion layer (step 102) showed in FIG. 1. Firstly, a modified surfactant is prepared (step 300), and then, a modified silicon dioxide is prepared (step 302). Although in FIG. 3, the modified surfactant is prepared first and the modified silicon dioxide is prepared after, but in other embodiments of this invention, the step 300 and the step 302 can be exchanged or can be performed simultaneously. In other words, the modified silicon dioxide can be prepared first and the modified surfactant can be prepared after, or the modified silicon dioxide and the modified surfactant can be prepared simultaneously.

Figure 4:
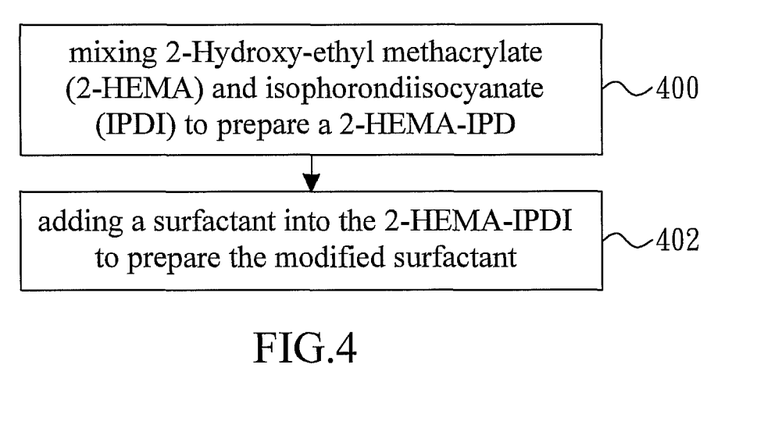
FIG. 4 is a flow chart illustration of a method for preparing a modified surfactant.
Figure 6A:
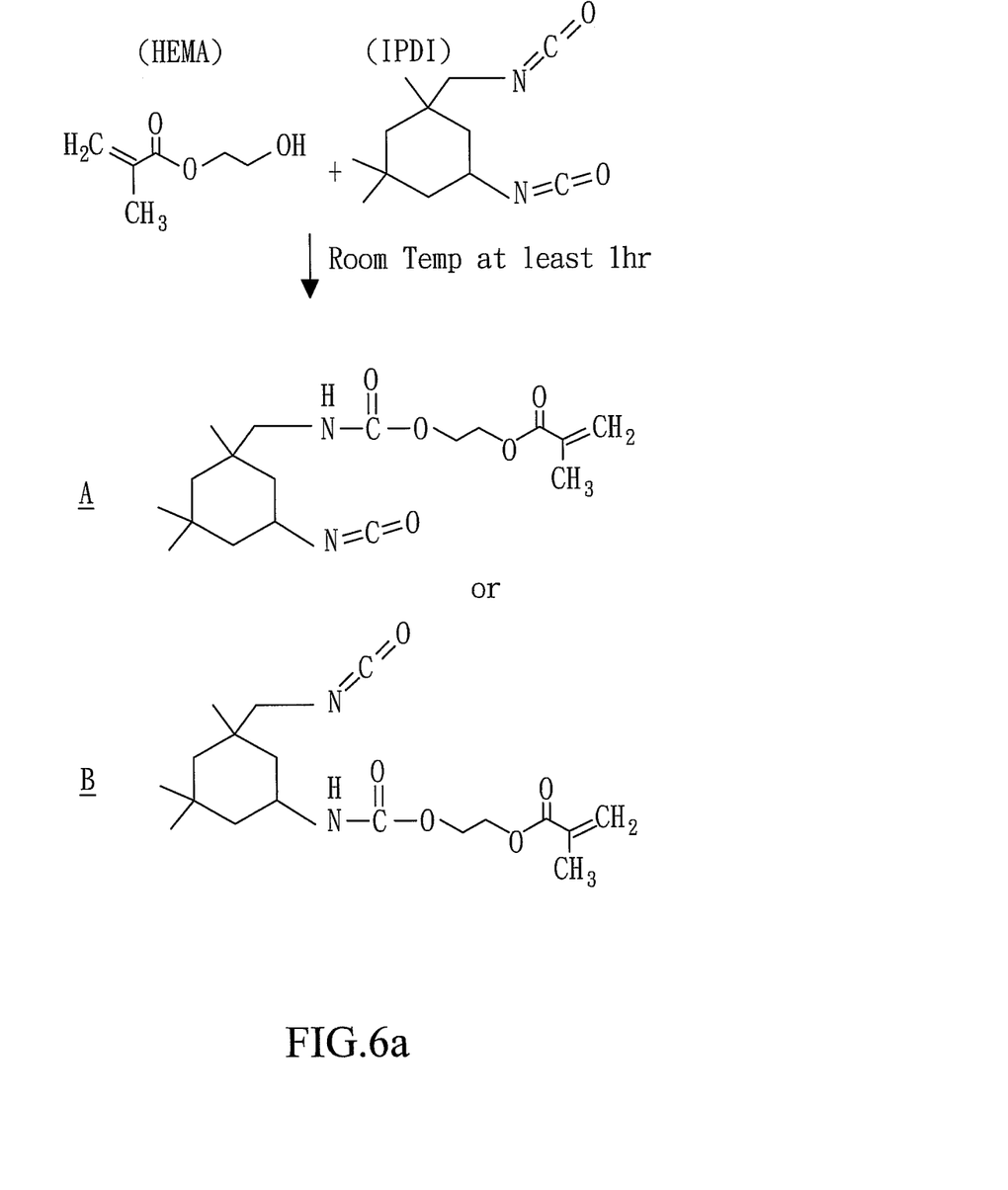
FIG. 6a and FIG. 6b show the chemical equations of preparing a modified surfactant.
Figure 6B:
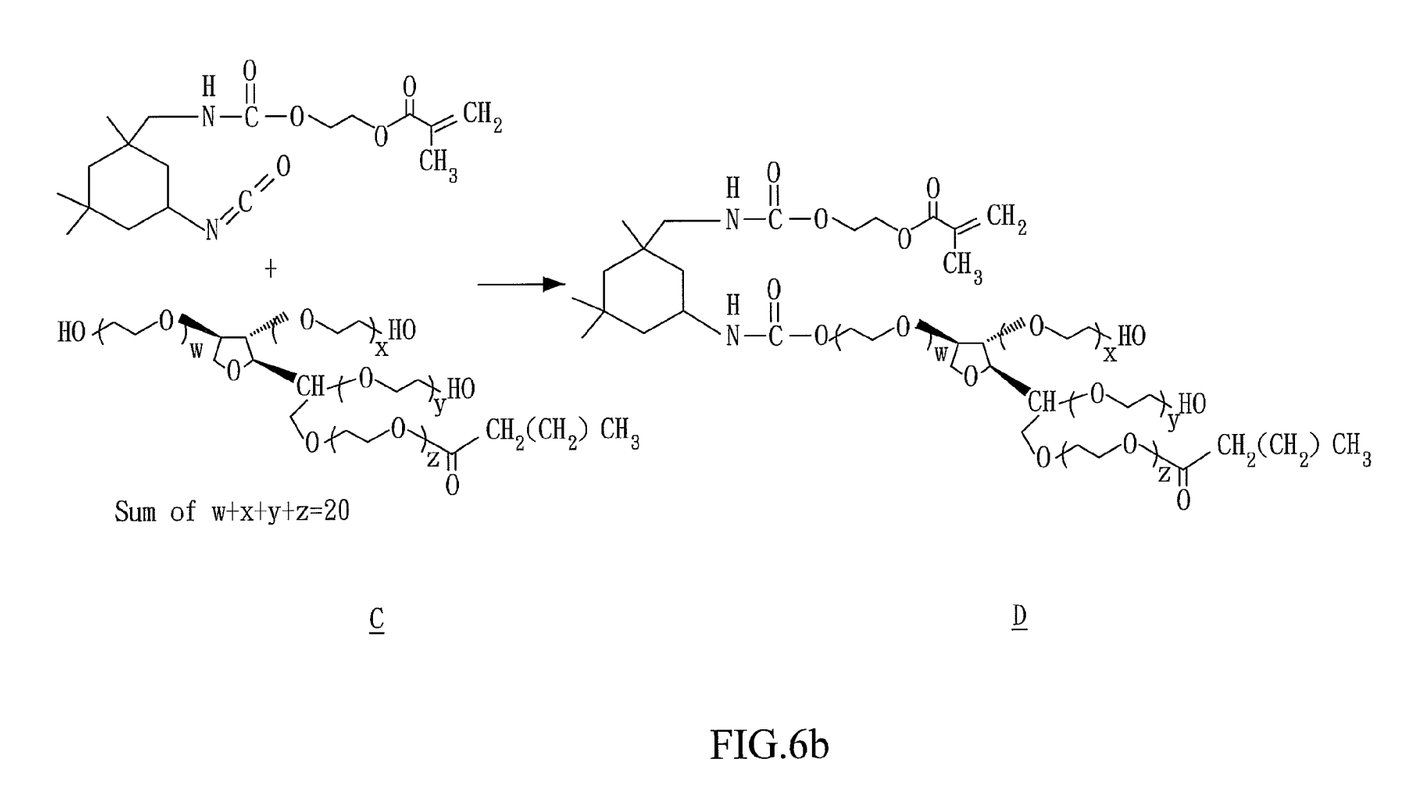

Referring FIG. 3, FIG. 4, FIG. 6a and FIG. 6b simultaneously, FIG. 4 is a flow chart illustration of the step of preparing a modified surfactant (step 300), and FIG. 6a and FIG. 6b show the chemical equations of preparing a modified surfactant (step 300). When the modified surfactant is prepared (step 300), 2-Hydroxy-ethyl methacrylate (2-HEMA) and isophorondiisocyanate (IPDI) are mixed to prepare a 2-HEMA-IPDI A, B (step 400). At the time, the mixture of the 2-HEMA and the IPDI is stirred at room temperature for at least 1 hour to form 2-HEMA-IPDI A, B by reaction of the 2-HEMA and the IPDI. The chemical equation (or reaction) of the 2-HEMA and the IPDI is showed in FIG. 6a. In step 400, the mixing percentage of the 2-HEMA is 10%-90% weight percentage (w/w) of total weight percentage (w/w), and the mixing percentage of the IPDI is 10%-90% weight percentage (w/w) of total weight percentage (w/w). The sum of the mixing percentage of the 2-HEMA and the mixing percentage of the IPDI are 100% weight percentage (w/w). In another embodiment of this invention, the mixing percentage of the 2-HEMA is 20%-80% weight percentage (w/w) of total weight percentage (w/w), and the mixing percentage of the IPDI is 20%-80% weight percentage (w/w) of total weight percentage (w/w) in step 400. In still another embodiment of this invention, the mixing percentage of the 2-HEMA is 35%-65% weight percentage (w/w) of total weight percentage (w/w), and the mixing percentage of the IPDI is 35%-65% weight percentage (w/w) of total weight percentage (w/w) in step 400.

And then, a surfactant C having hydroxyl groups (—OH) and a Sn catalyst are added into the 2-HEMA-IPDI A, B to prepare the modified surfactant D (step 402). After the reaction of hydroxyl groups (—OH) of the surfactant C and 2-HEMA-IPDI A, B, all of the —NCO groups of the 2-HEMA-IPDI A, B react with the hydroxyl groups (—OH) of the surfactant C but the carbon-carbon double bonds (C=C) of the 2-HEMA-IPDI A, B remain in the modified surfactant D. Therefore, the following UV curing process can be performed to the modified surfactant D. The reaction of the surfactant C and 2-HEMA-IPDI A, B is showed as FIG. 6b. The surfactant C is a hydrophilic surfactant, for example Tween 80, Tween 20, Glycerol, PEG 600, or other hydrophilic surfactants having similar structure or function as foregoing surfactant, such as a hydrophilic surfactant which has —($C_2H_4O$)— groups showed in FIG. 6b and the sum of the numbers w, x, y, z of the —($C_2H_4O$)— groups is 20 (w+x+y+z=20).

In step 402, the mixing percentage of the 2-HEMA-IPDI A, B is 10%-90% weight percentage (w/w) of total weight percentage (w/w), and the mixing percentage of the surfactant C is 10%-90% weight percentage (w/w) of total weight percentage (w/w). The sum of the mixing percentage of the 2-HEMA-IPDI A, B and the mixing percentage of the surfactant C are 100% weight percentage (w/w). In another embodiment of this invention, the mixing percentage of the 2-HEMA-IPDI A, B is 20%-80% weight percentage (w/w) of total weight percentage (w/w), and the mixing percentage of the surfactant C is 20%-80% weight percentage (w/w) of total weight percentage (w/w) in step 402. In still another embodiment of this invention, the mixing percentage of the 2-HEMA-IPDI A, B is 35%-65% weight percentage (w/w) of total weight percentage (w/w), and the mixing percentage of the surfactant C is 35%-65% weight percentage (w/w) of total weight percentage (w/w) in step 402.

Referring to FIG. 3 and the steps 200-202 showed in FIG. 2, step 302 is a step of preparing a modified silicon dioxide. In other words, the step 302 is a step of preparing an inorganic hybrid gel or a $MSiO_2$ sol because the modified silicon dioxide is an inorganic hybrid gel or a $MSiO_2$ sol. The method for preparing the modified silicon dioxide (inorganic hybrid gel or $MSiO_2$ sol) adopted in step 302 is the same with the method for preparing the inorganic hybrid gel (or $MSiO_2$ sol) showed in steps 200-202 of FIG. 2. Like steps 200-202, TEOS is used as an inorganic monomer or silicon dioxide ($SiO_2$) monomer and MSMA is used as a coupling agent to perform hydrolysis condensation for forming the inorganic hybrid gel or the $MSiO_2$ sol in step 302. The step 302 is not described herein again because the method showed in step 302 is the same with the method showed in steps 200-202 which are mentioned before.

Referring to FIG. 3, after the modified surfactant is prepared (step 300) and the modified silicon dioxide is prepared (step 302), the modified surfactant and the modified silicon dioxide are mixed together with proper mixing percentage (step 304). In step 304, the mixing percentage of the modified silicon dioxide is 0.01%-99.99% weight percentage (w/w) of total weight percentage (w/w), and the mixing percentage of the modified surfactant is 0.01%-99.99% weight percentage (w/w) of total weight percentage (w/w). The sum of the mixing percentage of the modified silicon dioxide and the mixing percentage of the modified surfactant are 100% weight percentage (w/w). In another embodiment of this invention, the mixing percentage of the modified silicon dioxide is 0.1%-99.9% weight percentage (w/w) of total weight percentage (w/w), and the mixing percentage of the modified surfactant is 0.1%-99.9% weight percentage (w/w) of total weight percentage (w/w) in step 304. In still another embodiment of this invention, the mixing percentage of the modified silicon dioxide is 1%-99% weight percentage (w/w) of total weight percentage (w/w), and the mixing percentage of the modified surfactant is 1%-99% weight percentage (w/w) of total weight percentage (w/w) in step 304.

And then, a photoinitiator and a photosensitive monomer are added into the mixture of the modified surfactant (as the compound D showed in FIG. 6b) and the modified silicon dioxide (as the compound b) to prepare or form a hydrophilic anti-fog coating having good hydrophility (step 306). In step 306, the same photoinitiator and the same photosensitive monomer as used in step 204 can be used to add into the mixture, but not limits. Other photoinitiator and photosensitive monomer having similar function and structure can be used in step 306. After step 306, the organic-inorganic hybrid hard adhesion layer on the base material (or the plastic material) is coated with the hydrophilic anti-fog coating by manual method, for example manual coating with a scraper or other manual methods, or by mechanical method, for example spin coating or other coating methods (step 308). And then, a soft bake, a UV curing, and a hard bake are performed to the hydrophilic anti-fog coating coated on the organic-inorganic hybrid hard adhesion layer to form a hydrophilic anti-fog coating film (step 310). In both of the soft bake process and the hard bake process, the hydrophilic anti-fog coating coated on the organic-inorganic hybrid hard adhesion layer is baked at the temperature of 60° C. to 80° C. for 10 seconds to 2 minutes in order to dry the hydrophilic anti-fog coating. The above mentioned baking temperature and baking time are not used to be the limits of the soft bake process and the hard bake process, and they can be changed according to any requirement.

When the hydrophilic anti-fog coating is illuminated with UV light (or energy) in step 310, the carbon-carbon double bonds (C=C) of the hydrophilic anti-fog coating (or the hydrophilic anti-fog coating film) are cross-linked with the carbon-carbon double bonds (C=C) of the organic-inorganic hybrid hard adhesion layer to form a cross-linked layer between the organic-inorganic hybrid hard adhesion layer and the hydrophilic anti-fog coating film. It is because the carbon-carbon double bonds (C=C) remain in both of the hydrophilic anti-fog coating (or the hydrophilic anti-fog coating film) and the organic-inorganic hybrid hard adhesion layer before the UV curing is performed. Due to the cross-linked layer, the hydrophilic anti-fog coating film can be adhered to the organic-inorganic hybrid hard adhesion layer tightly to get good chemical attachment or adhesion and to avoid breaking and peeling caused by intrusion of water. Even it is washed frequently, it is difficult for the hard, water-resistant anti-fog coating of this invention to be broken and peeled by intrusion of water or mist. Therefore, the anti-fog coating of this invention has good attachment or adhesion to the plastic material and has high water resistance.

Besides, the organic-inorganic hybrid hard adhesion layer is harder than the conventional anti-fog coating because the organic-inorganic hybrid hard adhesion layer is a hard adhesion layer prepared by UV curing. And the hydrophilic anti-fog coating film of this invention is harder than the conventional anti-fog coating as a result of the silicon dioxide ($SiO_2$) nano particles in the hydrophilic anti-fog coating film. Referring to Table 1, it lists the physical properties (for example hardness, contact angle, adhesion and anti-fog test) of different layers in the anti-fog coating prepared by foregoing method and the plastic material, and it also lists physical properties of the hydrophilic anti-fog coating films made of different hydrophilic surfactant.

TABLE 1

| Layer | Hardness | contact angle (°) | Adhesion (%) | anti-fog test |
|---|---|---|---|---|
| Plastic material (base material) | <H | 75 | — | fogged and opaque |
| organic-inorganic hybrid hard adhesion layer (lower layer) | 8H | 70 | 100% | fogged and opaque |
| hydrophilic anti-fog coating film (upper layer) | | | | |
| hydrophilic anti-fog coating film made of Glycerol | 6H | 37 | 100% | hydrophilic water drops |
| hydrophilic anti-fog coating film made of PEG 600 | 4H | 24 | 100% | hydrophilic water drops |
| hydrophilic anti-fog coating film made of Tween 80 | 5H | <5 | 100% | transparent water film |
| hydrophilic anti-fog coating film made of Tween 20 | 5H | <5 | 100% | transparent water film |

PS: In the Hardness term, the larger number stands for higher hardness. In the contact angle term, the smaller number stands for higher hydrophility. In the Adhesion term, the larger number stands for better adhesion.

The hardness of the conventional anti-fog coating is lower than 2H. The conventional anti-fog coating is easy to be intruded by water so that the adhesion of the conventional anti-fog coating is easy to be decreased as a result of intrusion of water. Therefore, adhesion of most of the conventional anti-fog coating is smaller than 100% and most of the conventional anti-fog coatings only can be used for several times or only can be used for a month. However, according to Table 1, it is recognized that in the anti-fog coating which has multi-layered structure and is prepared by the method of this invention, both of the organic-inorganic hybrid hard adhesion layer (lower layer) and the hydrophilic anti-fog coating film (upper layer) are much harder than the conventional anti-fog coatings (the hardness of the conventional anti-fog coating <2H). Referring to Table 1, the smallest hardness of the hydrophilic anti-fog coating film (upper layer) is 4H and all adhesion of the hydrophilic anti-fog coating film (upper layer) listed in Table 1 is 100%. Besides, referring to Table 1, it is recognized that all of the hydrophilic anti-fog coating films (upper layer) have relatively small contact angles to water drops. The biggest contact angle of these hydrophilic anti-fog coating films (upper layer) is only 37°. Therefore, all of the hydrophilic anti-fog coating films (or anti-fog coating) of this invention have very good hydrophility. As a result, the hydrophilic water drops or the transparent water film can be form by these hydrophilic anti-fog coating films (upper layer) without influence on the optical transmittance of the base material. Therefore, the anti-fog coating prepared by the method of this invention has the same anti-fog property than the conventional anti-fog coating, and even the anti-fog coating prepared by the method of this invention has the better anti-fog property than the conventional anti-fog coating.

Figure 7:
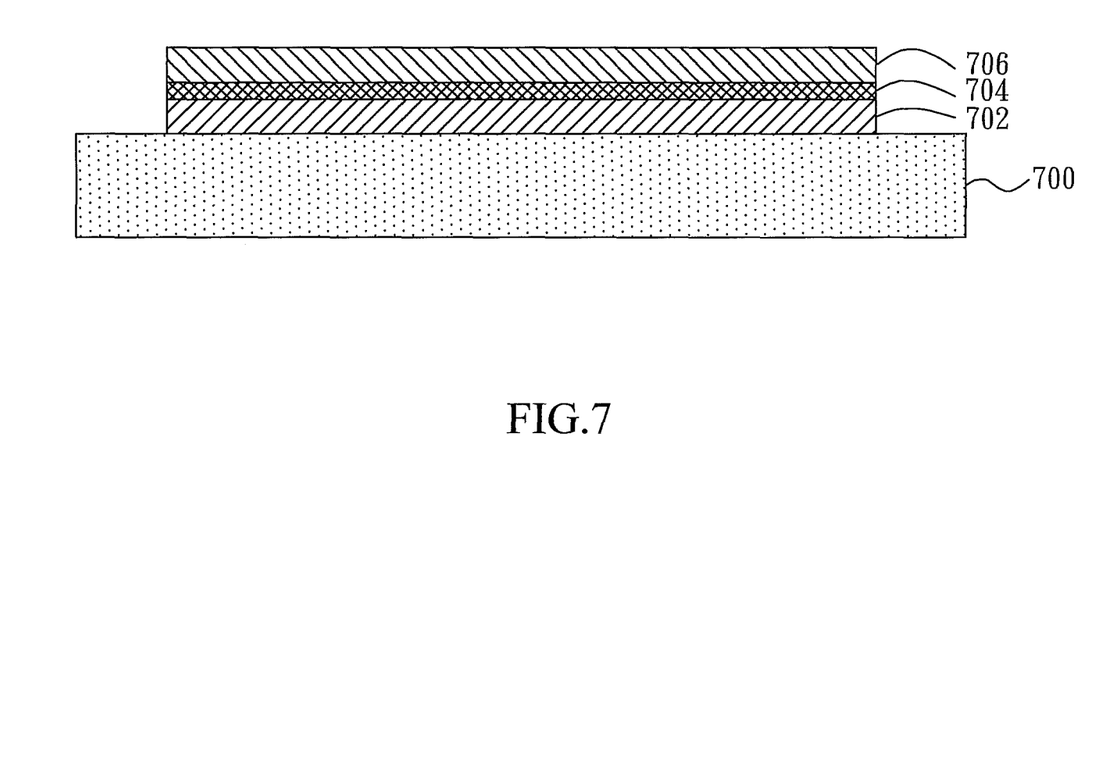
FIG. 7 is cross-section view diagram of a hard, water-resistant anti-fog coating in accordance with an embodiment of the present invention.

Therefore, it is clear to known that the anti-fog coating prepared by the method of this invention is a hard, water-resistant anti-fog coating. Referring to FIG. 7, it is cross-section view diagram of a hard, water-resistant anti-fog coating prepared by the method disclosed in this invention. The hard, water-resistant anti-fog coating has a multi-layered structure. The hard, water-resistant anti-fog coating comprises an organic-inorganic hybrid hard adhesion layer 702 formed on a base material (or plastic material) 700, a hydrophilic anti-fog coating film 706 formed on the organic-inorganic hybrid hard adhesion layer 702, and a cross-linked layer 704 formed between the organic-inorganic hybrid hard adhesion layer 702 and the hydrophilic anti-fog coating film 706. The organic-inorganic hybrid hard adhesion layer 702 is formed for increasing hardness and adhesion of the hard, water-resistant anti-fog coating to make it to be adhered on the base material (or the plastic material) 700 well. The hydrophilic anti-fog coating film 706 is formed for bringing anti-fog property to the base material (or the plastic material) 700. The cross-linked layer 704 is formed by cross-linking of the carbon-carbon double bonds (C=C) in the organic-inorganic hybrid hard adhesion layer 702 and the carbon-carbon double bonds (C=C) in the hydrophilic anti-fog coating film 706. Therefore, the hydrophilic anti-fog coating film 706 can adhere to the organic-inorganic hybrid hard adhesion layer 702 tightly by the cross-linked layer 704. It brings the good adhesion between the hydrophilic anti-fog coating film 706 and the organic-inorganic hybrid hard adhesion layer 702.

Moreover, the anti-fog coating prepared by foregoing method is difficult to be broken and damaged by intrusion of water or mist because it has high water resistance. Therefore, the anti-fog coating of this invention has longer lifetime and more using times than the conventional anti-fog coating. According to the actual using experience, the anti-fog coating of this invention still has good anti-fog property after one year. Therefore, the anti-fog coating of this invention still has lifetime of one year and even it has lifetime more than one year.

Accordingly, a method for manufacturing a hard, water-resistant anti-fog coating is provided in this invention, and particularly a method for manufacturing a hard, water-resistant anti-fog coating on plastic material is provided. The anti-fog coating which has better adhesion for plastic material, higher hardness, and better water resistance than the conventional anti-fog coating, can be prepared by this method. Furthermore, the anti-fog coating is difficult to be intruded and broken by water and it has longer lifetime.

What is claimed is:

1. A method for manufacturing a hard, water-resistant anti-fog coating, comprising:
forming an organic-inorganic hybrid hard adhesion layer on a base material wherein said organic-inorganic hybrid base material comprises a plurality of carbon-carbon double bonds (C═C), a first ultraviolet (UV) curing is performed in said step of forming an organic-inorganic hybrid hard adhesion layer on a base material but not all carbon-carbon double bonds (C═C) in said organic-inorganic hybrid hard adhesion layer reacts with the UV thereby there are some carbon-carbon double bonds (C═C) remained in said organic-inorganic hybrid hard adhesion layer without reacting with the UV; and
forming a hydrophilic anti-fog coating film on said organic-inorganic hybrid hard adhesion layer wherein said hydrophilic anti-fog coating film comprises a plurality of carbon-carbon double bonds (C═C), a second UV curing is performed in said step of forming a hydrophilic anti-fog coating film on said organic-inorganic hybrid hard adhesion layer thereby the remained carbon-carbon double bonds (C═C) in said organic-inorganic hybrid hard adhesion layer are crosslinked with said carbon-carbon double bonds (C═C) in said hydrophilic anti-fog coating film for forming a cross-linked layer between said organic-inorganic hybrid hard adhesion layer and said hydrophilic anti-fog coating film which causes the hardness of the hydrophilic anti-fog coating film on said organic-inorganic hybrid hard adhesion layer to be 4H to 6H.

2. The method of claim 1, wherein said base material is a plastic material.

3. The method of claim 1, wherein said step of forming an organic-inorganic hybrid hard adhesion layer on a base material comprises:
preparing an inorganic gel by hydrolysis condensation of an inorganic monomer;
adding a coupling agent into said inorganic gel to continue hydrolysis condensation for modifying surface of said inorganic gel to form an inorganic hybrid gel;
adding a photoinitiator and a photosensitive monomer into said inorganic hybrid gel to form an adhesion coating;
coating said base material with said adhesion coating; and
performing a first bake, said first UV curing, and a second bake to said adhesion coating coated on said base material to form said organic-inorganic hybrid hard adhesion layer.

4. The method of claim 3, wherein said inorganic monomer is tetraethoxylsilane (TEOS).

5. The method of claim 4, wherein said step of preparing an inorganic gel by hydrolysis condensation of an inorganic monomer is performed by uniformly mixing said tetraethoxylsilane (TEOS) and 2-propanol and by adding a hydrochloric acid solution to perform hydrolysis condensation reaction after.

6. The method of claim 5, wherein mixing percentage of said tetraethoxylsilane (TEOS) is 10%-90% weight percentage (w/w), and mixing percentage of said 2-propanol is 10%-90% weight percentage (w/w).

7. The method of claim 6, wherein mixing percentage of said tetraethoxylsilane (TEOS) is 20%-80% weight percentage (w/w), and mixing percentage of said 2-propanol is 20%-80% weight percentage (w/w).

8. The method of claim 7, wherein mixing percentage of said tetraethoxylsilane (TEOS) is 35%-65% weight percentage (w/w), and mixing percentage of said 2-propanol is 35%-65% weight percentage (w/w).

9. The method of claim 5, wherein pH value of said hydrochloric acid solution is 1-3.

10. The method of claim 3, wherein said coupling agent is 3-(trimethoxy silyl) propyl methacrylate (MSMA).

11. The method of claim 3, wherein said step of adding a coupling agent into said inorganic gel further comprises a step of resupplying a hydrochloric acid solution to continue said hydrolysis condensation.

12. The method of claim 11, wherein pH value of said hydrochloric acid solution is 1-3.

13. The method of claim 3, wherein said photoinitiator is Isopropyl thioxanthone (ITX).

14. The method of claim 3, wherein said photosensitive monomer is Dipentaerythritol hexaacrylate (DPHA), Trimethylol propane triacrylate (TMPTA), Pentaerythritol tetraacrylate (PETA), Di(trimethylolpropane) tetraacrylate (DiTMPTA), or 1,6-Hexanediol diacrylate (HDODA).

15. The method of claim 3, wherein said step of adding a photoinitiator and a photosensitive monomer into said inorganic hybrid gel comprises adding 1%-99% weight percentage of said photosensitive monomer, and adding 0.1%-10% weight percentage (wt %) of said photoinitiator.

16. The method of claim 15, wherein said step of adding a photoinitiator and a photosensitive monomer into said inorganic hybrid gel comprises adding 5%-80% weight percentage of said photosensitive monomer, and adding 0.5%-8% weight percentage (wt %) of said photoinitiator.

17. The method of claim 16, wherein said step of adding a photoinitiator and a photosensitive monomer into said inorganic hybrid gel comprises adding 10%-50% weight percentage of said photosensitive monomer, and adding 1%-5% weight percentage (wt %) of said photoinitiator.

18. The method of claim 3, wherein said step of performing UV curing to said adhesion coating is performed by illuminating said adhesion coating coated on said base material with proper UV energy and UV exposure, and at the time of curing said adhesion coating coated on said base material, portion of carbon-carbon double bonds (C═C) in said adhesion coating does not react with UV light wherein said organic-inorganic hybrid hard adhesion layer has good chemical attachment with said hydrophilic anti-fog coating film by reaction between said carbon-carbon double bonds (C═C) and said hydrophilic anti-fog coating film.

19. The method of claim 18, wherein said proper UV energy is 0.01-100 mJ/cm$^2$.

20. The method of claim 19, wherein said proper UV energy is 0.1-50 mJ/cm$^2$.

21. The method of claim 20, wherein said proper UV energy is 0.5-20 mJ/cm$^2$.

22. The method of claim 1, wherein said step of forming a hydrophilic anti-fog coating film on said organic-inorganic hybrid hard adhesion layer comprises:
preparing a modified surfactant;
preparing a modified silicon dioxide;
mixing said modified surfactant and said modified silicon dioxide to form a mixed solution of said modified surfactant and said modified silicon dioxide;

adding a photoinitiator and a photosensitive monomer into said mixed solution to prepare a hydrophilic anti-fog coating;

coating said organic-inorganic hybrid hard adhesion layer with said hydrophilic anti-fog coating; and performing a first bake, said second UV curing, and a second bake to said hydrophilic anti-fog coating coated on said organic-inorganic hybrid hard adhesion layer to form said hydrophilic anti-fog coating film.

23. The method of claim 22, wherein said step of preparing a modified surfactant comprises:

mixing 2-Hydroxy-ethyl methacrylate (2-HEMA) and isophorondiisocyanate (IPDI) to prepare a 2-HEMA-IPDI; and adding a surfactant into said 2-HEMA-IPDI to prepare said modified surfactant wherein after reaction of hydroxyl groups of said surfactant and said 2-HEMA-IPDI, said modified surfactant still contains portion of carbon-carbon double bonds of said 2-HEMA-IPDI which can be utilized to perform following UV curing process.

24. The method of claim 23, wherein said step of mixing 2-Hydroxy-ethyl methacrylate (2-HEMA) and isophorondiisocyanate (IPDI) is performed by mixing 10%-90% mole percentage (mol/mol) of said 2-Hydroxy-ethyl methacrylate (2-HEMA) and 10%-90% mole percentage (mol/mol) of said isophorondiisocyanate (IPDI).

25. The method of claim 24, wherein said step of mixing 2-Hydroxy-ethyl methacrylate (2-HEMA) and isophorondiisocyanate (IPDI) is performed by mixing 20%-80% mole percentage (mol/mol) of said 2-Hydroxy-ethyl methacrylate (2-HEMA) and 20%-80% mole percentage (mol/mol) of said isophorondiisocyanate (IPDI).

26. The method of claim 25, wherein said step of mixing 2-Hydroxy-ethyl methacrylate (2-HEMA) and isophorondiisocyanate (IPDI) is performed by mixing 35%-65% mole percentage (mol/mol) of said 2-Hydroxy-ethyl methacrylate (2-HEMA) and 35%-65% mole percentage (mol/mol) of said isophorondiisocyanate (IPDI).

27. The method of claim 23, wherein said surfactant is a hydrophilic surfactant.

28. The method of claim 23, wherein said step of adding a surfactant into said 2-HEMA-IPDI is performed by mixing 10%-90% mole percentage (mol/mol) of said 2-HEMA-IPDI and 10%-90% mole percentage (mol/mol) of said surfactant.

29. The method of claim 28, wherein said step of adding a surfactant into said 2-HEMA-IPDI is performed by mixing 20%-80% mole percentage (mol/mol) of said 2-HEMA-IPDI and 20%-80% mole percentage (mol/mol) of said surfactant.

30. The method of claim 29, wherein said step of adding a surfactant into said 2-HEMA-IPDI is performed by mixing 35%-65% mole percentage (mol/mol) of said 2-HEMA-IPDI and 35%-65% mole percentage (mol/mol) of said surfactant.

31. The method of claim 22, wherein said step of preparing a modified silicon dioxide comprises:

preparing a silica sol by hydrolysis condensation of a silicon oxide compound; and adding a coupling agent into said silica sol to continue said hydrolysis condensation for modifying surface of said silica sol to form a silicon dioxide hybrid gel.

32. The method of claim 22, wherein said step of mixing said modified surfactant and said modified silicon dioxide is performed by mixing 0.01%-99.99% weight percentage (w/w) of said modified silicon dioxide and 0.01%-99.99% weight percentage (w/w) of said modified surfactant.

33. The method of claim 32, wherein said step of mixing said modified surfactant and said modified silicon dioxide is performed by mixing 0.1%-99.9% weight percentage (w/w) of said modified silicon dioxide and 0.1%-99.9% weight percentage (w/w) of said modified surfactant.

34. The method of claim 33, wherein said step of mixing said modified surfactant and said modified silicon dioxide is performed by mixing 1%-99% weight percentage (w/w) of said modified silicon dioxide and 1%-99% weight percentage (w/w) of said modified surfactant.

* * * * *